United States Patent
Lee

(10) Patent No.: US 9,816,608 B1
(45) Date of Patent: Nov. 14, 2017

(54) GEAR ENGAGEMENT METHOD FOR A HYBRID VEHICLE

(71) Applicant: HYUNDAI MOTOR COMPANY, Seoul (KR)

(72) Inventor: Jong Ho Lee, Gwacheon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/374,861

(22) Filed: Dec. 9, 2016

(30) Foreign Application Priority Data

Oct. 21, 2016 (KR) .................. 10-2016-0137803

(51) Int. Cl.
*F16H 61/12* (2010.01)
*F16H 59/70* (2006.01)
(Continued)

(52) U.S. Cl.
CPC .............. *F16H 61/12* (2013.01); *B60K 6/36* (2013.01); *B60K 6/387* (2013.01); *B60K 6/547* (2013.01); *B60W 20/50* (2013.01); *F16H 59/44* (2013.01); *F16H 59/70* (2013.01); *F16H 61/0403* (2013.01); *F16H 61/688* (2013.01); *B60Y 2200/92* (2013.01); *B60Y 2300/1805* (2013.01); *B60Y 2300/18025* (2013.01); *B60Y 2300/20* (2013.01); *B60Y 2300/70* (2013.01); *B60Y 2400/428* (2013.01); *B60Y 2400/70* (2013.01); *F16H 2059/446* (2013.01); *F16H 2059/706* (2013.01); *F16H 2061/1224* (2013.01); *F16H 2200/0052* (2013.01); *F16H 2312/02* (2013.01);
(Continued)

(58) Field of Classification Search
CPC .............. F16H 2059/446; F16H 61/12; F16H 61/0403; F16H 2061/1224; B60W 20/50
See application file for complete search history.

(56) References Cited

U.S. PATENT DOCUMENTS

| | | | |
|---|---|---|---|
| 5,595,550 A * | 1/1997 | Jarvis .................... | B60W 10/02 477/84 |
| 2009/0038424 A1 * | 2/2009 | Schneider ....... | B60W 30/18054 74/335 |

(Continued)

FOREIGN PATENT DOCUMENTS

| | | |
|---|---|---|
| JP | 4608298 | 1/2011 |
| JP | 5835573 | 12/2015 |

(Continued)

*Primary Examiner* — Edwin A Young
(74) *Attorney, Agent, or Firm* — Lempia Summerfield Katz LLC

(57) ABSTRACT

A gear engagement method for a hybrid vehicle includes detecting whether or not baulking occurs when a controller attempts to engage a target gear via a synchronizer. The gear engagement method also includes checking, by the controller, for a stationary state of the vehicle if the result of the detecting shows that there is baulking. The gear engagement method also includes engaging, by the controller via the synchronizer, a different gear that shares a same input shaft with the target gear if the result of the checking shows that the vehicle is in a stationary state. The gear engagement method also includes reattempting an engagement with the target gear after disengaging the different gear. The disengaging and the reattempting are performed by the controller via the synchronizer after the engaging.

5 Claims, 2 Drawing Sheets

(51) Int. Cl.
  *F16H 59/44*   (2006.01)
  *F16H 61/688*  (2006.01)
  *F16H 61/04*   (2006.01)
  *B60K 6/387*   (2007.10)
  *B60K 6/36*    (2007.10)
  *B60K 6/547*   (2007.10)
  *B60W 20/50*   (2016.01)

(52) U.S. Cl.
  CPC ........ *Y10S 903/909* (2013.01); *Y10S 903/914* (2013.01); *Y10S 903/919* (2013.01); *Y10S 903/945* (2013.01)

(56) References Cited

U.S. PATENT DOCUMENTS

| | | | | |
|---|---|---|---|---|
| 2011/0112736 | A1* | 5/2011 | Nakade | B60T 7/12 701/58 |
| 2012/0325038 | A1* | 12/2012 | Schmidt | F16H 61/0206 74/473.11 |
| 2016/0152228 | A1 | 6/2016 | Jang | |

FOREIGN PATENT DOCUMENTS

| KR | 10-1321614 | 10/2013 |
|---|---|---|
| KR | 10-2016-0047178 | 5/2016 |
| KR | 10-2016-0065617 | 6/2016 |

\* cited by examiner

GEAR ENGAGEMENT METHOD FOR A HYBRID VEHICLE

CROSS REFERENCE TO RELATED APPLICATION

The present application claims priority to Korean Patent Application No. 10-2016-0137803, filed Oct. 21, 2016, the entire contents of which are incorporated herein for all purposes by this reference.

BACKGROUND

Field

The present embodiments relate generally to resolving the gear baulking phenomenon in a hybrid vehicle while the vehicle is stationary, without having to operate the engine or motor.

Description of the Related Art

Generally, a transmission is installed between a clutch and a propulsion shaft and serves to increase or decrease a rotational force of an engine according to a driving condition of the vehicle.

With a manual transmission (MT), a baulking phenomenon may occur between gear rows during a gear shift, in relation to timing of the gear shift. This baulking phenomenon mainly occurs due to a rebounding between gear rows when the driver's clutch manipulation and gear shift manipulation are not performed concurrently.

In the case of a gasoline vehicle mounted with an engine according to the related art, the gear baulking phenomenon described above may be resolved, regardless of whether the vehicle is moving or stationary, by using the idle rotation of the engine to control the stroke of the clutch actuator.

However, in step with the increased interest in environment friendly solutions in recent times, there is increased activity in developing hybrid vehicles, which are powered by both an engine and a motor.

In the case of a hybrid vehicle equipped with an automated manual transmission such as a dual clutch transmission (DCT), for example, if the gear baulking phenomenon occurs while in a stationary state, the speed of the transmission input shaft is 0 because the engine is not running. Therefore, even if the stroke of the clutch actuator were controlled, the gear alignment would not be altered, and the baulking phenomenon would not be resolved. The foregoing is intended merely to aid in the understanding of the background of the present embodiments, and is not intended to provide that the present embodiments fall within the purview of the related art that is already known to those skilled in the art.

SUMMARY

The present embodiments are provided keeping in mind the above problems occurring in the related art. One or more of the present embodiments provide a gear engagement method for a hybrid vehicle that may resolve the gear baulking phenomenon without having to operate the engine or motor, even if the gear baulking phenomenon occurs when the hybrid vehicle is stationary.

According to one aspect, a gear engagement method for a hybrid vehicle includes detecting whether or not baulking occurs when a controller attempts to engage a target gear via a synchronizer. The gear engagement method also includes checking, by the controller, for a stationary state of the vehicle if the result of the detecting shows that there is baulking. The gear engagement method includes engaging, by the controller via the synchronizer, a different gear that shares a same input shaft with the target gear if the result of the checking shows that the vehicle is in a stationary state. The gear engagement method also includes reattempting an engagement with the target gear after disengaging the different gear. The disengaging and the reattempting are performed by the controller via the synchronizer after the engaging.

The target gear may be set as the first gear or the reverse gear according to a range position of a gear shift lever.

If the transmission of the vehicle is a DCT and if the target gear is the first gear, then the controller may set the different gear to an odd number gear other than the first gear when performing the engaging.

If the transmission of the vehicle is a DCT and if the target gear is the reverse gear, then the controller may set the different gear to an even number gear other than the reverse gear when performing the engaging.

If it is recognized, as a result of the checking, that the vehicle is in a driven state, then the controller may perform the reattempting immediately.

With the gear engagement method for a hybrid vehicle described above, gear baulking may be resolved without operating the engine or the motor even if the gear baulking phenomenon occurs while the hybrid vehicle is in a stationary state. By thus reducing noise from otherwise having to operate the engine or motor, the noise, vibration, and harshness (NVH) performance may be improved.

BRIEF DESCRIPTION OF THE DRAWINGS

The above and other objects, features and other advantages of the present embodiments will be more clearly understood from the following detailed description when taken in conjunction with the accompanying drawings, in which.

DETAILED DESCRIPTION

Figure 1:
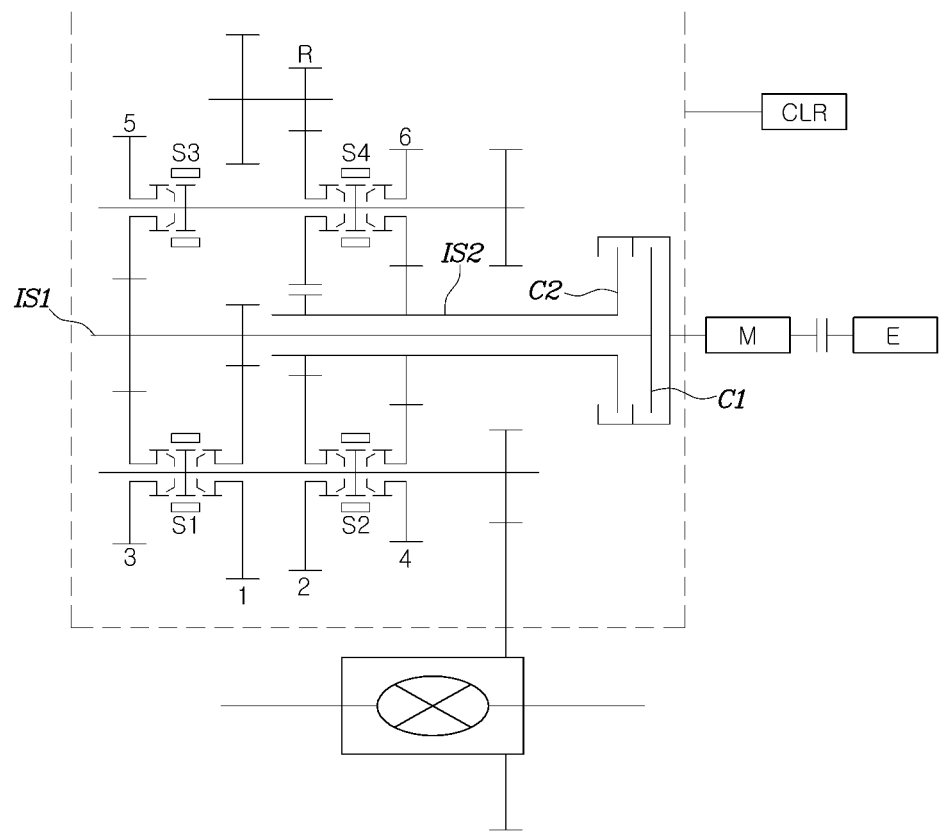
FIG. 1 is a diagram illustrating a powertrain structure of a hybrid vehicle according to an embodiment.

Hereinbelow, embodiments will be described in detail with reference to the accompanying drawings. Throughout the drawings, the same reference numerals will refer to the same or like parts.

FIG. 1 is a diagram illustrating a powertrain structure of a hybrid vehicle according to an embodiment. As illustrated in FIG. 1, the powertrain of a hybrid vehicle may be of a transmission mounted electric device (TMED) type with an engine E, engine clutch, motor M, transmission, and a differential interconnected to one another. Also, the transmission may be provided as a dual clutch transmission (DCT), in which a multiple number of clutches are provided to prevent the sensation of discontinuity during a gear shift, where a controller controls synchronizers S1, S2, S3, S4 and first and second clutches C1, C2 of the interior. The operation of each component will be described below in further detail.

Figure 2:
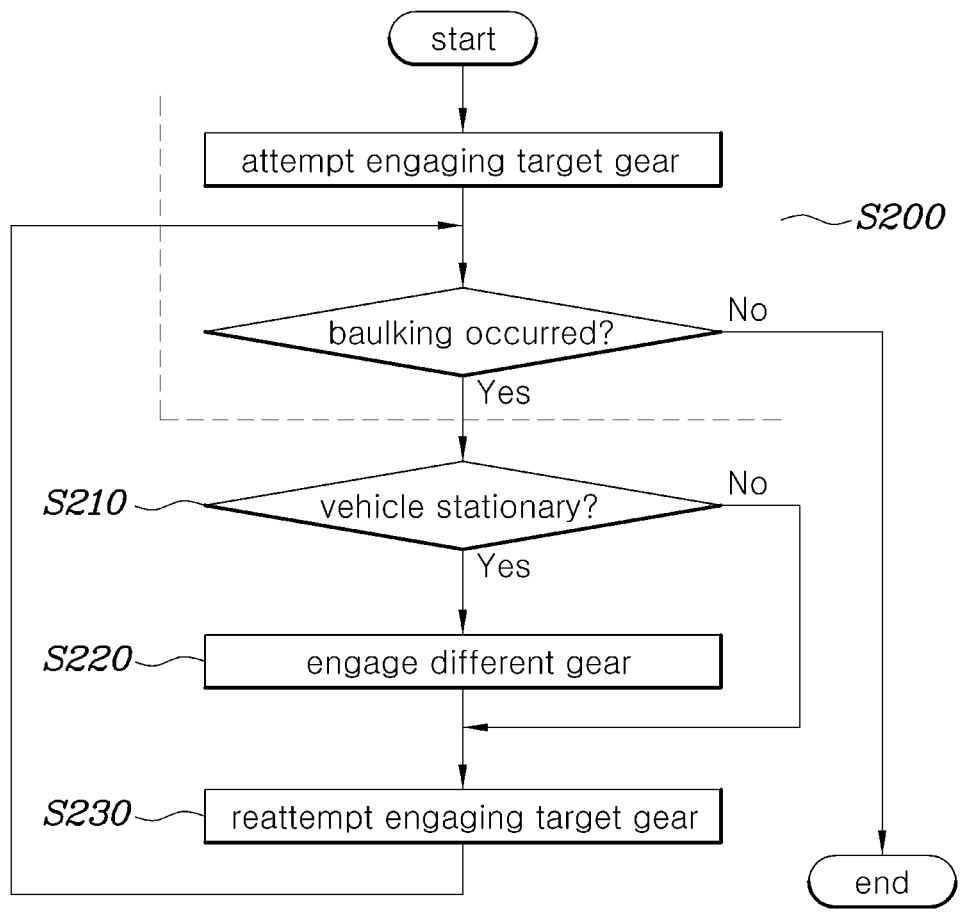
FIG. 2 is a flowchart illustrating a gear engagement method for a hybrid vehicle according to an embodiment.

FIG. 2 is a flowchart illustrating a gear engagement method for a hybrid vehicle according to an embodiment. Referring to FIG. 2, the gear engagement method for a hybrid vehicle may include detecting whether or not baulking occurs when a controller CLR attempts to engage a target gear via a synchronizer (S200). The controller CLR checks for a stationary state of the vehicle (S210) if the result of the detecting (S200) shows that there is baulking. The controller CLR engages a different gear that shares a same input shaft with the target gear by way of a synchronizer (S220) if the result of the checking (S210) shows that the vehicle is in a stationary state. The controller CLR disengages the different gear and reattempts an engagement with the target gear by way of a synchronizer (S230), after the engaging act (S220) has been performed.

Baulking refers to the phenomenon in which, during an attempt to engage a gear, a cog on a sleeve of the synchronizer meets an end portion of a cog on a clutch gear of a transmission gear so that the two components do not properly engage each other.

In other words, when the controller CLR attempts a gear shift for the vehicle by operating a gear actuator, but an actuator stroke does not increase to a preset value, gear baulking has been detected (S200).

In cases where such gear baulking phenomenon has been detected, the engine would not be running if the vehicle is in a stationary state, since the vehicle is a hybrid vehicle. Therefore, since the input shaft is not being rotated, any subsequent attempts to engage the target gear would result in the occurrence of gear baulking.

Thus, according to one embodiment of a method, if it is determined that the vehicle is in a stationary state (S210), then a different gear that shares the same input shaft as the target gear may be engaged (S220) to minutely rotate the input shaft, and then another attempt to engage the target gear may be made (S230). The gear baulking phenomenon is thereby resolved.

More specifically, the target gear may be set as the first gear or the reverse gear according to the range position of the gear shift lever.

In other words, while the vehicle is in a stationary state, if the range position of the gear shift lever is the D range, then an attempt to engage the first gear for forward driving may be desirable, whereas if the range position of the gear shift lever is the R range, then an attempt to engage the reverse gear for backward driving may be desirable.

If the transmission of the vehicle is a DCT, and the target gear is the first gear, then the controller CLR may set the different gear as an odd number gear other than the first gear in performing the engaging.

In other words, as illustrated in FIG. 1, the first gear is arranged to share the same input shaft (e.g., the odd number gear input shaft IS1) with the third gear and the fifth gear. Thus, if the target gear is set as the first gear, then the controller CLR may use a synchronizer S1 or S3 to engage the third gear or the fifth gear.

When the third gear or the fifth gear is thus engaged, the odd number gear input shaft IS1 may be minutely rotated as the cog on the sleeve of the synchronizer meshes with the cog on the clutch gear of the third gear or the fifth gear. As a result, if the first gear is engaged again, the baulking phenomenon is resolved.

Conversely, if the transmission of the vehicle is a DCT, and the target gear is the reverse gear, then the controller CLR may set the different gear as an even number gear other than the reverse gear in performing the engaging.

In other words, the reverse gear is arranged to share the same input shaft (e.g., the even number gear input shaft IS2) with the second, fourth, and sixth gears. Thus, if the target gear is set as the reverse gear, then the controller CLR may provide control for engaging one of the second gear, the fourth gear, or the sixth gear using a synchronizer S2 or S4 to minutely rotate the even number gear input shaft IS2. As a result, if another attempt is made to engage the reverse gear, the baulking phenomenon is resolved.

However, if the transmission of the vehicle is structured such that all of the gears share a single input shaft, then the controller CLR resolves the gear baulking by engaging any of the transmission gears other than the target gear and then engaging the target gear.

If, as a result of the checking (S210), it is found that the vehicle is being driven, then the controller CLR may perform the reattempt (S230) immediately.

This is because if the vehicle is not in a stationary state, the engine E or motor M is being driven and the input shaft is being rotated. Thus, another attempt to engage the target gear may be performed immediately, and whether or not the gear baulking phenomenon has been resolved may be checked. Consequently, the time delay for resolving the gear baulking when starting the vehicle may be reduced.

According to the gear engagement method for a hybrid vehicle described above, gear baulking may be resolved without operating the engine or the motor even if the gear baulking phenomenon occurs while the hybrid vehicle is in a stationary state. By thus reducing noise from otherwise having to operate the engine or motor, the NVH performance may be improved.

Although embodiments have been described for illustrative purposes, those skilled in the art will appreciate that various modifications, additions, and substitutions may be provided without departing from the scope and spirit of the invention as disclosed in the accompanying claims.

What is claimed is:

1. A gear engagement method for a hybrid vehicle, the gear engagement method comprising:
   detecting whether or not baulking occurs when a controller attempts to engage a target gear via a synchronizer;
   checking, by the controller, for a stationary state of a vehicle when the baulking is detected as a result of the detecting;
   engaging, by the controller via the synchronizer, a different gear when the vehicle is recognized to be in the stationary state as a result of the checking, the different gear sharing a same input shaft with the target gear; and
   reattempting, by the controller via the synchronizer after the engaging of the different gear, an engagement with the target gear after disengaging the different gear.

2. The gear engagement method of claim 1, further comprising setting the target gear as a first gear or a reverse gear according to a range position of a gear shift lever.

3. The gear engagement method of claim 2, wherein a transmission of the vehicle is a dual clutch transmission (DCT), and
   wherein the method further comprises setting, by the controller, the different gear to an odd number gear other than the first gear in performing the engaging of the different gear when the target gear is the first gear.

4. The gear engagement method of claim 2, wherein a transmission of the vehicle is a dual clutch transmission (DCT), and
   wherein the method further comprises setting, by the controller, the different gear to an even number gear other than the reverse gear in performing the engaging of the different gear when the target gear is the reverse gear.

5. The gear engagement method of claim 1, wherein the reattempting comprises reattempting, by the controller via the synchronizer after the engaging of the different gear, immediately when the vehicle is recognized to be in a driven state as a result of the checking.

\* \* \* \* \*